March 26, 1963 F. H. MILLER, JR 3,082,495

CONVEYOR TRANSFER MACHINE

Filed Jan. 15, 1960 6 Sheets-Sheet 1

INVENTOR.
FRANK H. MILLER, JR.

BY William R. Price

ATTORNEY

March 26, 1963 F. H. MILLER, JR 3,082,495

CONVEYOR TRANSFER MACHINE

Filed Jan. 15, 1960 6 Sheets-Sheet 2

INVENTOR
FRANK H. MILLER, JR.

BY William R. Price
ATTORNEY

March 26, 1963 F. H. MILLER, JR 3,082,495

CONVEYOR TRANSFER MACHINE

Filed Jan. 15, 1960 6 Sheets-Sheet 3

INVENTOR
FRANK H. MILLER, JR.

BY William R. Rice

ATTORNEY

March 26, 1963 F. H. MILLER, JR 3,082,495

CONVEYOR TRANSFER MACHINE

Filed Jan. 15, 1960 6 Sheets-Sheet 4

*INVENTOR.*
FRANK H. MILLER, JR.

*BY* William R. Price

ATTORNEY

CONVEYOR TRANSFER MACHINE

Filed Jan. 15, 1960 6 Sheets-Sheet 5

INVENTOR.
FRANK H. MILLER, JR.
BY William R. Price
ATTORNEY

INVENTOR.
FRANK H. MILLER, JR

BY William R. Price

ATTORNEY

United States Patent Office 3,082,495

Patented Mar. 26, 1963

3,082,495

CONVEYOR TRANSFER MACHINE

Frank H. Miller, Jr., Louisville, Ky., assignor to Miller Engineering Corporation, Louisville, Ky., a corporation of Kentucky Filed Jan. 15, 1960, Ser. No. 2,649
9 Claims. (Cl. 22—31)

This invention relates to conveying apparatus and particularly to a method and means for transferring an article from an overhead conveyor to a lower conveyor or from a lower conveyor to an overhead conveyor.

Specifically, this invention relates to conveying apparatus in relation to the molding or casting of articles. More specifically this invention relates to a method and means for the accurate placement of a complementary mold section suspended from an overhead conveyor onto a mold section on a lower conveyor and to the subsequent separation of complementary mold sections and a method and means for replacing one of said sections onto a hook suspended from an overhead conveyor.

The present invention is especially applicable to overhead conveyors, commonly known as overhead trolley conveyors and lower conveyors commonly referred to as truck conveyors. The former conveyors conventionally comprise an endless chain driven by sprockets with the links of the chain suspended from a series of roller supports or trolleys which roll along a fixed trackway situated above the chain. The latter conveyors are conventionally pulled by an endless chain driven by sprockets and run on a fixed ground-level trackway. When the two conveyor systems are used in combination, the fixed trackways define a common path which normally leads to a series of work stations wherein various operations are performed.

The problem of transferring articles from one conveyor to another is complicated by the fact that conveyor chain links are not easily synchronized. Even in a single continuous conveyor chain, the pitch of successive links is not constant due to accumulated clearances, tolerances, wear and manufacturing variations. Additionally with two conveyor systems, the difference in load and the resulting difference in the rate of wear in one conveyor chain over another, complicates accurate synchronization of the two systems, especially when synchronization must be maintained for a prolonged period. Thus in operations involving accurate registering and engagement of parts, as for example, the engagement and disengagement of complementary mold sections, accurate synchronization is a continuing problem.

While the improvements embodied in the present invention may be generally applied, they are of particular application to the molding and casting art, and in particular to the engagement and disengagement of permanent complementary mold sections. Accordingly, the invention may be most readily understood in reference to these operations.

The production of molded or casted articles involves seven steps. These steps are: (1) production of complementary mold sections. In the metal casting art, these sections comprise a bottom or drag part and a top or cope part. In the plastic molding art these sections may comprise a female mold and a male mold called a core. (2) Accurate engagement of the mold sections. (3) Clamping the two sections of the mold together. (4) Filling the space between the two sections of the mold. (5) Unclamping of the mold sections. (6) Removal or stripping of one mold section from the article and the other mold section. (7) Removal of the article from the remaining portion of the mold.

The advantage of the application of overhead conveyors and lower truck conveyors in these operations was recognized at an early date. See for example, U.S. Patent 776,696 to C. W. Sherman. Generally the lower mold portion is transferred by means of a lower truck conveyor driven by a link chain or similar device. The upper mold portion is carried by a hook on a trolley conveyor or on a travelling crane. The problem is, of course, to get the upper mold section off of the hook or crane and onto the lower mold section, and subsequently to get the upper mold section off of the lower mold section and back onto the hook or crane.

An object of this invention is the automatic transfer of an object from an overhead conveyor to a lower conveyor and the automatic transfer of an object from a lower conveyor to an overhead conveyor.

A more specific object of this invention is to provide a means for registering, engaging and disengaging complementary mold sections, which system is applicable to upper and lower conveyor systems.

Still another object of the invention is the removal of a mold section from the molded article and placement of said mold section onto a hook of an overhead trolley conveyor.

In one embodiment of this invention a machine is provided for removing an object from an overhead trolley conveyor and accurately placing that object onto a lower conveyor.

In another embodiment of this invention a machine is provided for the removal of an object from the lower conveyor and placement of the object onto a hook of an overhead conveyor.

In still another embodiment of this invention provision is made for lifting a mold section above the barbed portion of a hook and means for deflecting the hook in order to remove the mold section therefrom.

In still another embodiment of this invention provision is made for a lifting means to lift a mold section above a hook, sensing means to locate the hook and to actuate the lowering of the mold section onto the hook.

The present invention involves basically a work station comprising a stationary trackway or a primary supporting frame and a secondary frame movable thereon, in which the said secondary frame is maintained in engagement with an article on a lower conveyor until said lower conveyor comes to rest. In this manner the various operative means are in proper position with the article on said conveyor, despite the fact that the point of rest of the lower conveyor may vary from time to time. The movable seondary frame contains means for contacting an object of an overhead conveyor to actuate stopping of said overhead conveyor, lifting means designed to compensate for differences in positioning of the objects on the two conveyors, means to deflect a hook on an overhead conveyor to facilitate removal of an object from said hook, and means for detecting the hook to facilitate placement of an object on said hook.

The invention will be better understood by reference to the attached drawing, which for convenience illustrates the machine of the invention in relation to the production of molded tubs.

Referring now to the attached drawings,

FIG. 1 is an isometric view of the machine of this invention. This machine comprises a primary supporting frame and a secondary reciprocal frame movable thereon. Fragments of the structure have been broken away to illustrate the relationship of the various parts to each other, and to the upper trolley conveyor and the lower truck conveyor.

Figure 1:
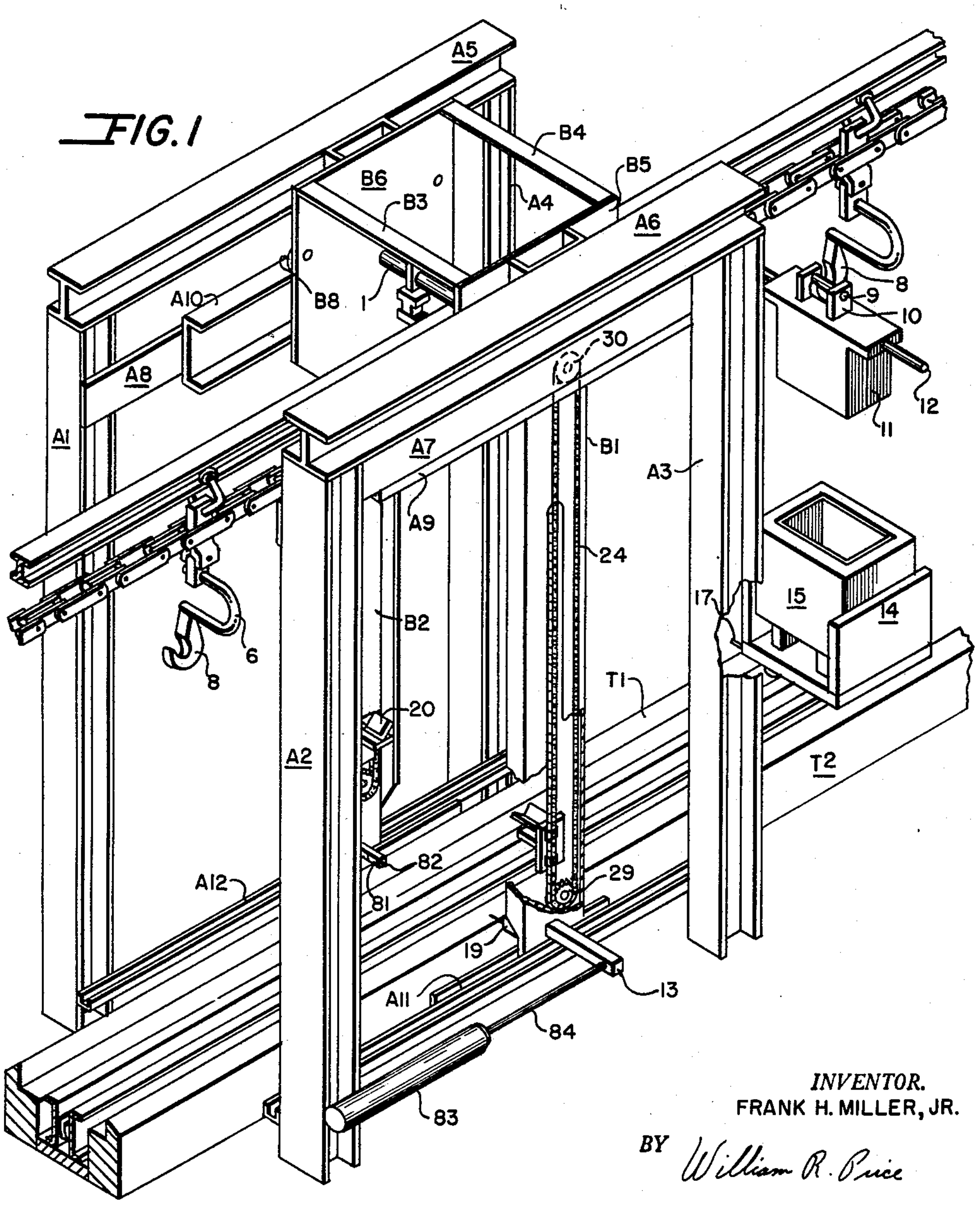
Figure 2:
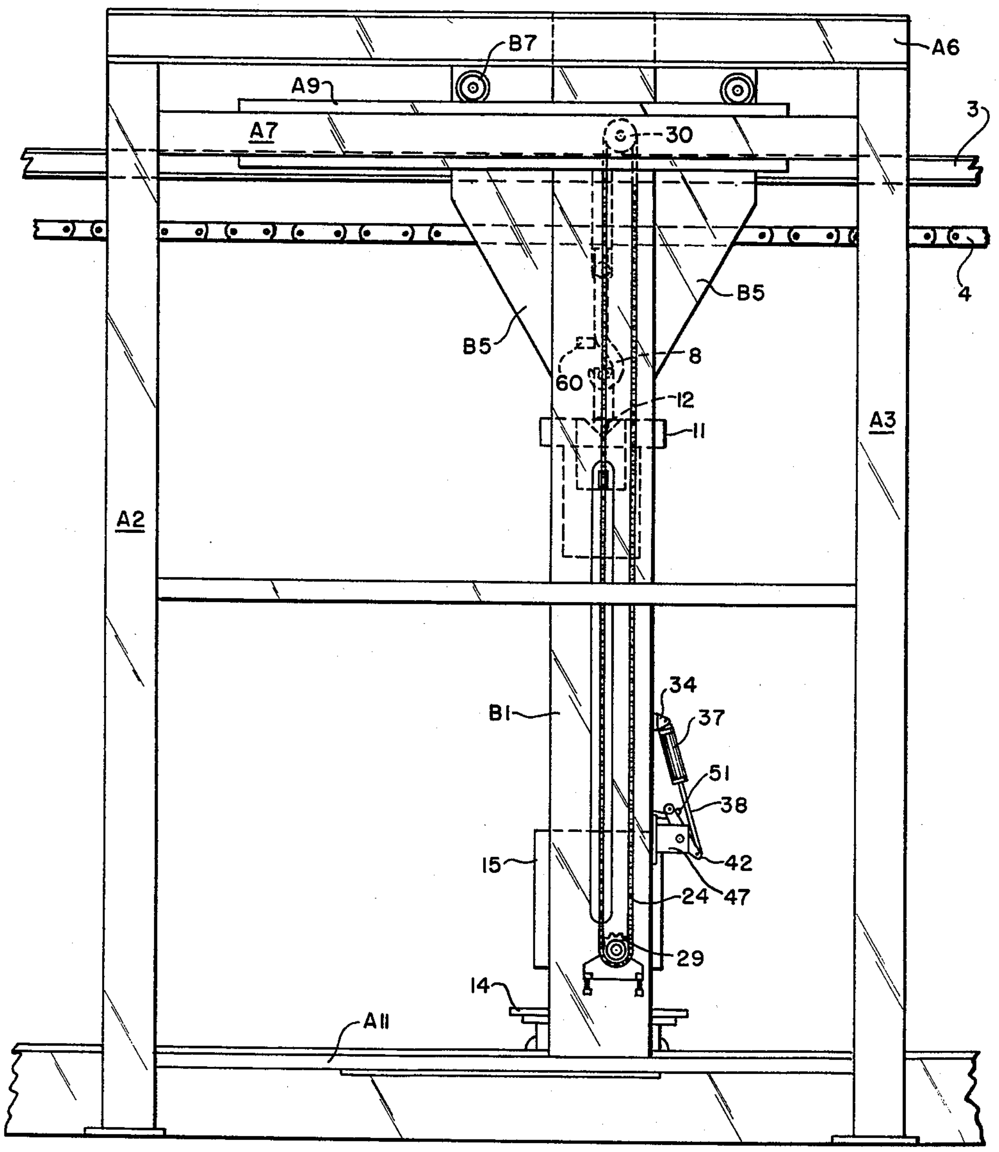
FIG. 2 is a side elevation of the machine.

As is best illustrated in FIG. 1 the unit consists of a welded primary supporting frame comprising 4 vertical I-beams which are illustrated in the drawing as A–1, A–2, A–3 and A–4 and two horizontal I-beams indicated as A–5, and A–6 welded to vertical beams A–1 and A–4 and A–2 and A–3 respectively. Two horizontal supporting cross pieces welded to A–1 and A–4 and A–2 and A–3 respectively, are designated by numerals A–8 and A–7. Residing on and attached to A–7 is a track designated A–9 and corresponding thereto on A–8 is another track designated A–10. Attached horizontally at the bottom of the main frame and welded to A–2 and A–3 is a sliding guide designated as A–11. A corresponding sliding guide designated A–12 is welded to vertical supports A–1 and A–4. The secondary frame consists at the top of two horizontal cross pieces designated B–3 and B–4 which are welded to large metal plates designated B–5 and B–6 respectively. Two pendant members in vertical position are designated as B–1 and B–2. These pendant members B–1 and B–2 fit at the bottom in the sliding guides of the main frames A–11 and A–12 respectively. Attached to metal plate B–5 are two wheels designated as B–7 which fit on tracks A–9. In like manner attached to plate B–6 are two wheels designated as B–8 which run along track A–10. The wheels B–7 and B–8 running on tracks A–9 and A–10 respectively allow almost frictionless reciprocation of the secondary frame on the main supporting frame. The sliding guides A–11 and A–12 in which fits the lower portion of vertical posts of the secondary frame B–1 and B–2 respectively, prevent distortion of the frame as the mold sections are lifted during the operation.

The movement of the secondary frame within the limits of tracks A–9 and A–10 of the primary frame is limited by pneumatic cylinder designated by numeral 83 and its piston rod designated by 84 in engagement with flange 13 of B–1 of the secondary frame. Pneumatic cylinder 83 pushes the secondary frame into a waiting position for the conveyor 14 running on track T–1 and T–2.

Figure 3:
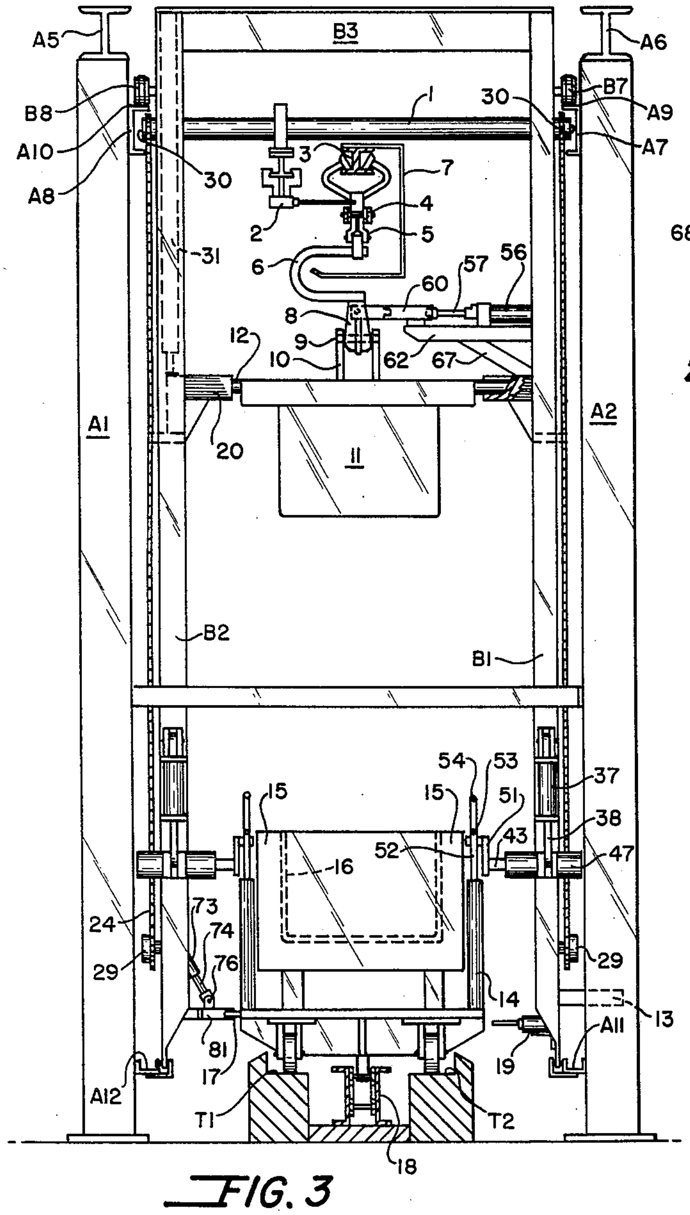
FIG. 3 is an end view showing the truck conveyor in position and the core in elevated position at the core insertion station.

Referring now to FIG. 3 the truck conveyor designated generally by numeral 14 is shown in position being engaged by means of truck conveyor pin designated by numeral 17 with the arm of the towbar assembly designated by numeral 81. The truck conveyor is driven by a link chain indicated generally by numeral 18 and as the truck conveyor pin 17 engages with the arm of the towbar assembly 81, limit switch 82 on arm 81 signals the arrival of the lower mold section at the work station. Pneumatic cylinder 83 through its piston rod 84 engages with flange designated by numeral 13 and this holds the secondary frame against the truck conveyor 14 until it comes to rest. The entire frame is then in proper position for the core insertion operation. Limit switch 2, suspended from shaft 1 of the secondary frame contacts bracket 5 supporting hook 8 and signals arrival of hook 8. Numeral 3 designates the trolley conveyor which is a conventional Louden Monorall attached to link chain 4 by brackets 5 which are in turn attached to a large sanitary hook designated by numeral 6 welded to non-rotatable hook designated by numeral 8. The sanitary hook is shaped like a large U and is designed to pass by metal canopy 7 so that rust and grease from the Monorall and link chain are prevented from dripping on to the work pieces situated below. The core designated by numeral 11 comprises a handle which consists of a horizontal piece designated by numeral 9 running through two vertical pieces designated by numeral 10. The core also contains a yoke piece designated by numeral 12. In the drawing the core 11 is shown in elevated position having been lifted by lifting member designated by numeral 20 above the barbed portion of the hook 8. The lifting members are driven by hydraulic cylinder designated in the drawing as numeral 31 which is attached to a lug of the lifting member and in turn drives chain 24 around idler sprocket 29 and sprocket 30 best shown in FIG. 4. A shaft 30–S attached to the corresponding sprocket on the other side and drives the corresponding lifting member via idler sprocket 29. Thus both lifting members are synchronized with each other. The truck conveyor is designated by numeral 14 which in turn holds the female mold designated by numeral 15. The space defined by the walls of the female mold and the walls of the core is designated generally by numeral 16. The conveyor pin attached to the truck conveyor is designated by numeral 17 and the driving means for the truck conveyor is designated by numeral 18. 19 designates a limit switch which is an auto-reject which actuates raising of the towbar assembly arm 81 and ceases the cycle of operation when a bad core or female mold is rejected. This is accomplished by the operator placing a collar on conveyor pin 17. Numeral 20 designates the lifting member which is an angle iron having a hypotenuse of about 2 inches which allows a two inch play between the positioning of the core above and the truck below. In this manner when the lifting member 20 engages with the yoke 12 of core 11 the yoke slips to the middle of the lifting member and is thus accurately positioned for insertion into the female mold below. It is obvious of course that an arc-shaped lifting member could be utilized or any other suitable shape in which the yoke of the core would slide to the middle of the lifting member for proper positioning. It is also possible to compensate for a greater play between the location of the overhead core and the lower female mold by utilizing a lifting member with longer sides so that the yoke of the core would engage with the lifting members. Generally, however, the compensation afforded by the legs of the lifting members in positioning of the two objects need be no greater than one link of the link chain since a link may be easily installed or removed to make up discrepancies due to wear.

Figures 4, 13, 14:
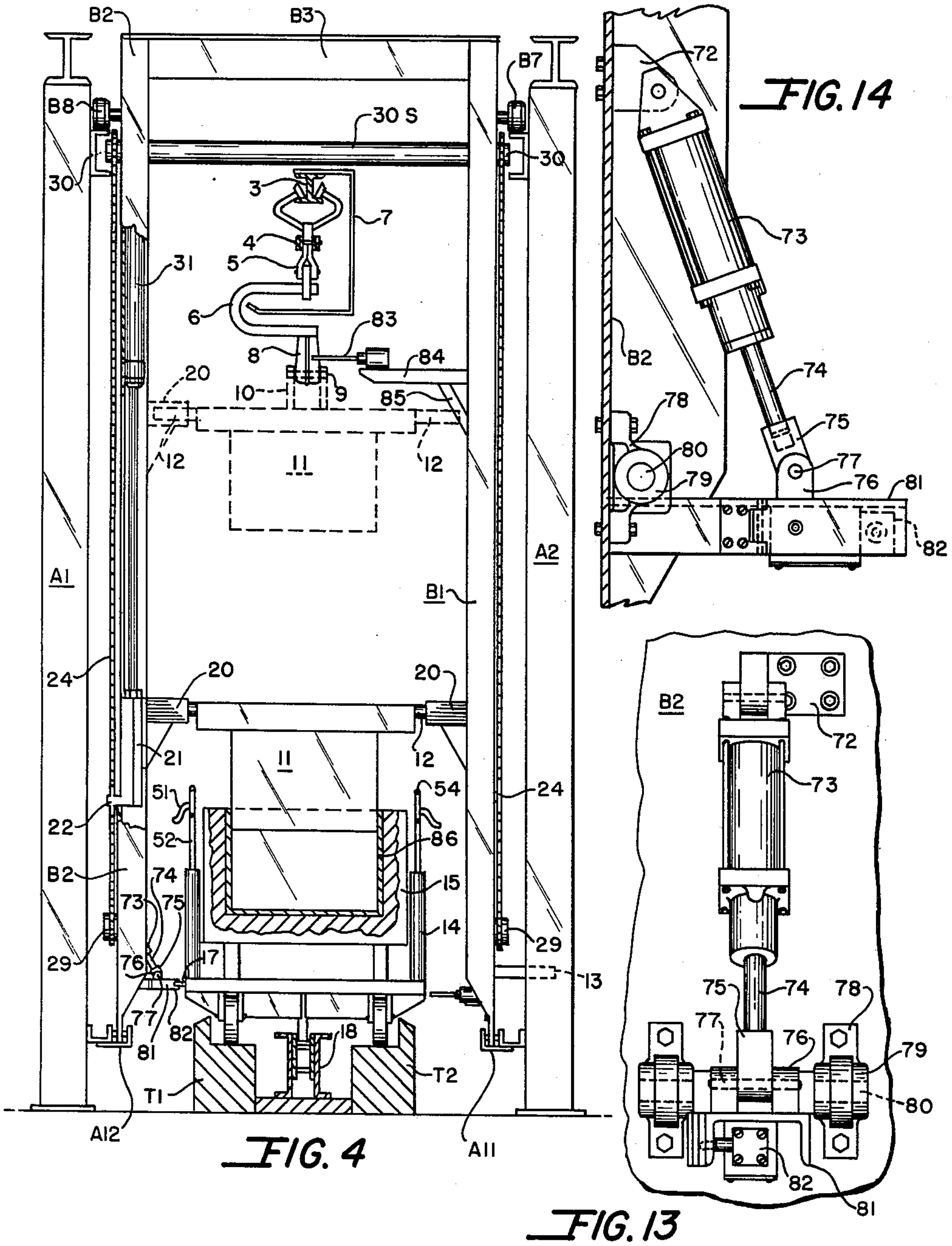
FIG. 4 is an end view of the machine at the core removal station. This view illustrates the secondary frame in relation to the truck conveyor as the core is lifted from the molded tub.
FIG. 13 is an elevation as viewed from the center line of the conveyor facing B–2 of the towbar assembly.
FIG. 14 is a detail end view of the towbar assembly.

Referring to FIG. 4 the mechanism is seen in the operation of removing the core from the molded tub. In this figure the yoke 12 of core 11 is in engagement with lifting member 20. Hook detector designated by numeral 83 is held by support piece 84 which is bolted on to B–1 of the secondary frame and further supported by bracket 85. Hook detector 83 is a micro switch "wobblestick" produced by Minneapolis Honeywell. The lifting member 20 driven by hydraulic cylinder 31 is shown in dotted lines above the barbed portion of the hook 8 which is about to be contacted with hook detector 83. This actuates extension of the hydraulic piston of hydraulic cylinder 31 to lower the lifting member 20 and thus place the core 11 on to hook 8. In this figure the driving means for the lifting members is shown. Lifting member 20 is attached to support piece 21 which is in turn bolted on to lug 22 which is attached to chain 24. Chain 24 revolves on idler sprocket 29 and upper sprocket 30 which by means of shaft 30–S drives the chain on the right-hand of the figure so that the lifting and lowering action of lifting members 20 are synchronized with each other.

Figures 5, 6:
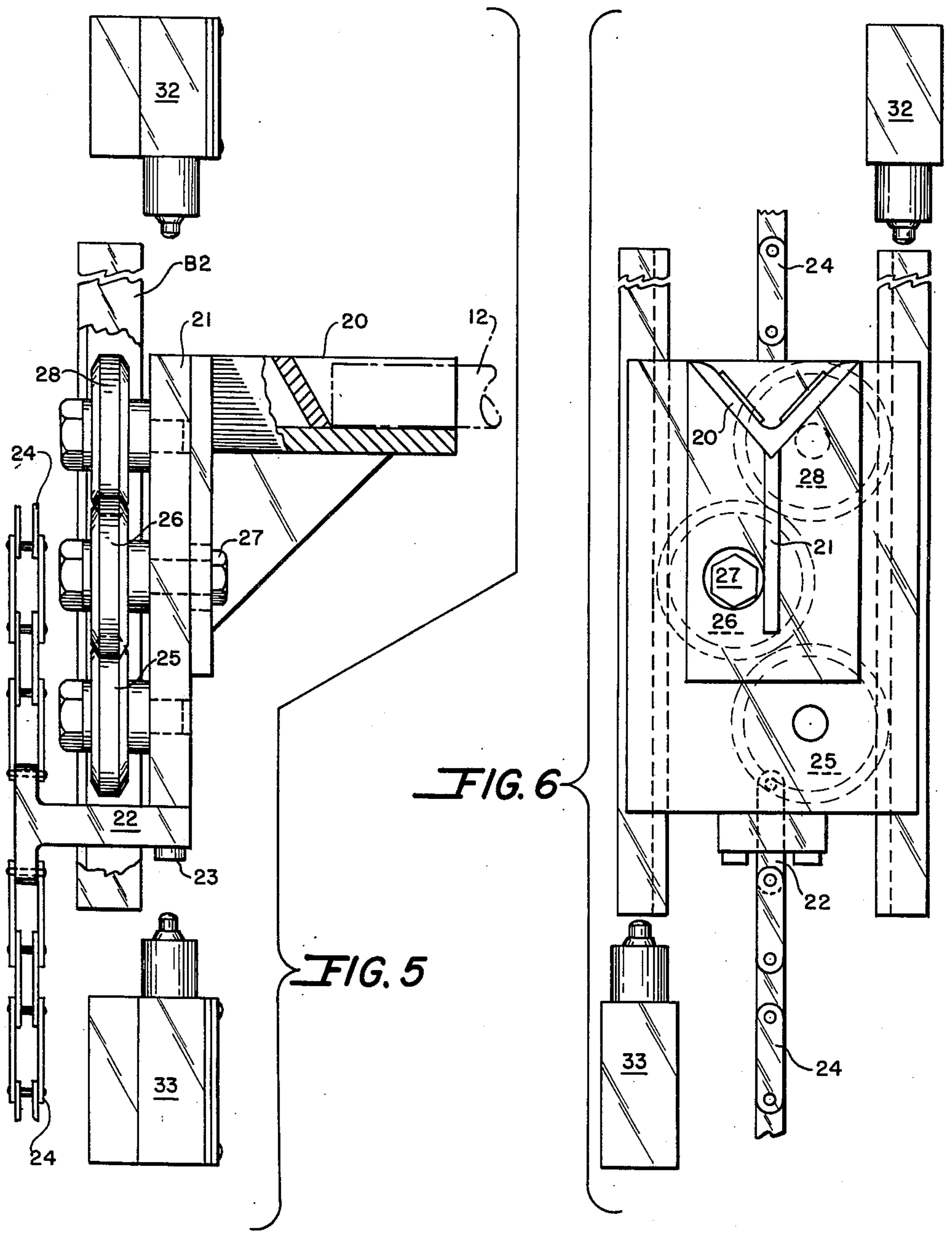
FIG. 5 is a semi-diagrammatical sectional view of the lifting mechanism viewed from the end.
FIG. 6 is a semi-diagrammatical view of the lifting mechanism, as seen from a position over the center line of the lower conveyor facing B–2.

Referring now to FIG. 5, numeral 20 designates the lifting member, which is attached by suitable brackets to supporting piece 21 which is in turn attached to lug 22 by means of bolt 23. Lug 22 is attached to a chain designated by numeral 24. Numeral 25 and numeral 28 designate two roller bearings on the same plane while numeral 26 designates another roller bearing attached by eccentric bolt 27. Bolt 27 can be adjusted so that all three bearings are freely operative along slide guide B–2. At the upper and lower end of slide guide B–2 is an upper and lower limit switch designated generally by 32 and 33.

FIG. 6 is another view of the same elements from the inside of the conveyor facing B–2, and illustrates the shape of lifting member 20.

Figures 7, 8:
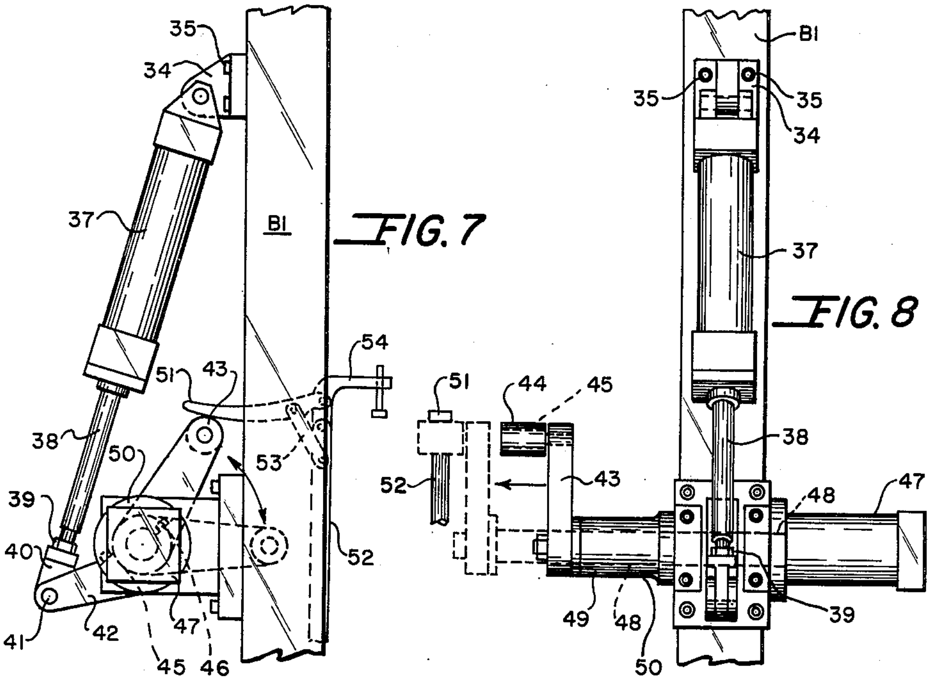
FIG. 7 is a detailed view from the side facing B–1 showing the mechanism of the clamp operating mechanism.
FIG. 8 is a detailed view from the end showing said clamp operating mechanism.

Referring now to FIG. 7 the detail of the clamp operating mechanism is shown. Numeral 37 designates a pneumatic cylinder which is attached to B–1 by means of a clevis bracket 34. The clevis bracket 34 is attached by bolts 35 to B–1 of the secondary frame. 38 designates the piston rod of the pneumatic cylinder, attached by nut 39 to clevis bracket 40. Clevis pin 41 engages the clevis bracket 40 with actuating arm 42. The actuating arm is attached by means of a split ring, which is held by bolts 45 and 46 onto the housing of the mechanism, designated by numeral 50. Numeral 43 designates a cam which is attached by bolt 45 to the striking member 44. Another pneumatic cylinder 47 is better illustrated in FIG. 8. This cylinder has a piston rod designated by numeral 48 which fits into a spline which is designated by numeral 49 and which fits inside of the housing 50. The spline prevents rotation of the piston rod within the housing 50. In operation air cylinder 47 by means of piston rod 48 pushes the clamp operating mechanism 43, 44 and 45 into engagement position with the toggle clamp designated by numerals 51 to 54. In FIG. 7 the mechanism is shown in engagement with the piston rod 38 of pneumatic cylinder 37 extended. As the piston rod 38 is retracted, striking member 43 moves down in an arc to engage handle 51 of toggle clamp and push said handle into clamping position.

At the core removal station the rod 48 of pneumatic cylinder 47 is shortened about ½ inch so that the mechanism engages on the lower side of handle 51 of the toggle clamp and by extension of the piston rod 38 of pneumatic cylinder 37 the striking member swings in an arc upwardly to unclamp said toggle clamp.

Figure 9:
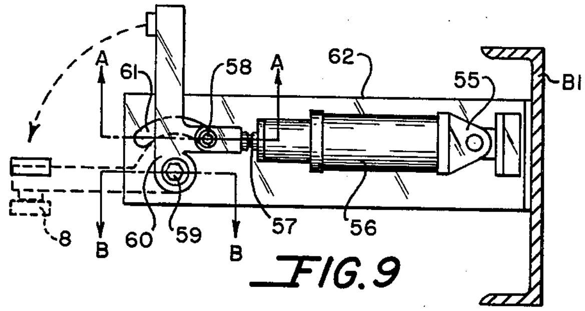
FIG. 9 is a plan view showing the detail of the hook deflector.

FIG. 9 is a plan view of the hook deflector showing it in relationship to vertical support B–1 and the hook 8. The hook deflector comprises pneumatic cylinder 56 which is clamped by means of a clevis bracket 55 onto pendant member B–1 of the secondary frame. The piston rod of 57 of pneumatic cylinder 56 is attached to a bolt 58 which moves in slot designated by numeral 61. Striker arm 60 is attached to bolt 58 and to bolt 59, the latter being its pivot point. The striker arm is shown in engagement with the hook 8.

Figure 10:
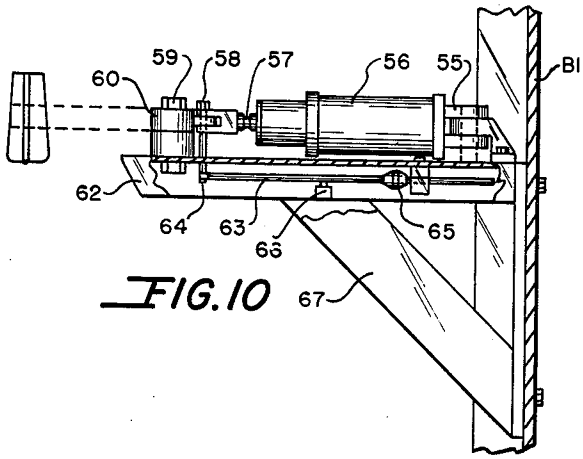
FIG. 10 is a side view showing the detailed mechanism of the hook deflector.

Referring now to FIG. 10 the housing of the hook deflector mechanism is designated by numeral 62 which contains rod 63 which is attached to bolt 58 by rotatable bolt 64. Cam 65 is attached to the rod 63. Upon extension of piston rod 57, rod 63 is extended within housing 62 so that cam 65 comes into contact with limit switch 66 inside the housing. The bolt 58 runs along slot 61 thus driving the striker arm into contact with the hook. The entire housing is supported by bracket 67.

Figure 11:
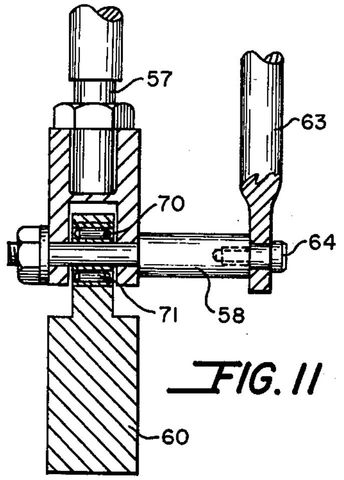
FIG. 11 is a section taken from A—A of FIG. 9.

FIG. 11 is a section A—A taken from FIG. 9 which shows the connection of the striker arm 60 with the bolt 58 and the packing surrounding said bolt which consists of needle bearings 70 and 71 respectively.

Figure 12:
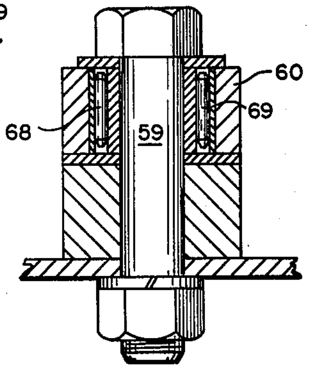
FIG. 12 is a section taken from B—B of FIG. 9.

FIG. 12 is a section taken along line B—B of FIG. 9 and shows the packing surrounding bolt 59 consisting of needle bearings 68 and 69.

FIG. 13 shows the detail of the towbar assembly which consists of pneumatic cylinder 73 having a piston rod 74 attached by collar 75 to clevis bracket 76. The other end of the pneumatic cylinder 73 is attached by means of clevis bracket 72 to B–2 of the secondary frame. Clevis pin 77 of clevis bracket 76 holds the collar of piston rod 74 in position with clevis bracket 76. Clevis bracket 76 is attached to arm 81 which pivots on shaft 80, packed with pillow block bearing 79. This is attached onto B–2 of the secondary frame by bracket 78. The arm 81 of towbar assembly contains at its outer end limit switch 82 which is actuated by contact with conveyor pin 17 of truck conveyor 14. This switch 82, on contact with the conveyor pin 17, actuates the entire cycle of operation.

*Core Insertion Operation*

In FIG. 1 the secondary frame is shown in waiting position awaiting the arrival of the truck conveyor 14 and the core 11. Hydraulic cylinder 83 by means of its piston rod 84 in engagement with flange 13 of pendant member B–1 holds the secondary frame in the waiting position. Upon contact of the two-pin 17 of truck conveyor 14 with towbar assembly 81, limit switch 82 signals the engagement of the pin 17 with the towbar assembly 81.

This may be by means of an electrically operated brake on the driving motor or by any conventional means. The low pressure cylinder 83 holds the secondary frame in engagement with the conveyor pin 17 until the truck conveyor comes to a stop. The cylinder 83 thus prevents the secondary frame from roaming out of engagement with the truck conveyor and thus overcomes the momentum transferred from the truck conveyor to the secondary frame. As is best shown in FIG. 3, shaft 1 connected to the secondary frame supports limit switch 2 which contacts brackets 5 attaching the hook 8 containing the core 11 to the trolley conveyor 3. Thus the hook of the overhead trolley conveyor is stopped at essentially the same point as the truck conveyor by a signal from limit switch 2, even though a subsequent truck conveyor may stop at another point at this station. This allows positioning of the hook of overhead trolley with the lower truck conveyor within one to two inches of each other. This obviously is not sufficiently accurate for placement of a core into a mold in which a tub having walls of less than ½ inch thickness is to be molded. As previously indicated the discrepancy in placement of the two articles is compensated by means of the lifter member 20. Thus for example if the lifter member is in the form of an angle iron with its point facing downwardly, the hypotenuse, i.e. the distance between the legs of the angle iron, is equal to 3 inches, the lifting members will make contact with yoke 12 of the core and the yoke 12 will slide to the center of the lifting member. As previously stated the lifting member need not be an angle iron, but may be in the form of an arc or of any suitable shape allowing the yoke member of the core to slide to the center portion of the lifting member.

The closing of limit switches 2 and 82 completes the circuit to energize the solenoid (not shown) of cylinder 31. As the cycle begins, lifting members 20 driven by hydraulic cylinder 31, via chain 24, sprocket 30 and idler sprocket 29 and shaft 30S are raised to engage with the yoke 12 of core 11. The core is lifted to a level so that cross piece 9 of the handle 10 is above the barbed portion of the hook 8. Supporting member 21 of lifting member 20, contacts limit switch 32 which energizes the solenoid of the hook deflector mechanism, so that the hook deflector striking arm deflects the hook. Cam 65 contacts limit switch 66 which de-energizes the solenoid of cylinder 31 thus lowering the lifting mechanism to insert the core into the mold carried on truck conveyor 14. Bolt 23 of the lifting member contacts limit switch 33 which energizes solenoid (not shown) of pneumatic cylinder 47. Piston rod 48 is thus extended and pushes the clamping mechanism into position. By retraction of piston rod 38 of pneumatic cylinder 37, striking arm 44 is drawn in an arc downwardly to strike handle 51 of the toggle clamp attached to the truck conveyor and thus closes the clamp onto the core. This holds the core and mold in position during the filling operation. The operation of the clamp operating mechanism is best illustrated in FIG. 7. At this point the solenoid (not shown) of pneumatic cylinder 73 of the towbar assembly is actuated by a signal from limit switch (not shown) on the clamping mechanism. Piston rod 74 pulls the arm of the towbar assembly 81 out of engagement with conveyor pin 17 so that the completed assembly can roll onto the filling operation. Arm 81 of the towbar assembly is lowered back into engagement position and the entire secondary frame is moved by means of hydraulic cylinder 83 back into loading position.

*Core Removal Operation*

In this operation which is best illustrated by FIG. 4 the truck conveyor comes into position with the arm 81 of towbar assembly and closes limit switch 82, thus energizing the solenoid (not shown) of pneumatic cylinder 47 of the clamp operating mechanism. The clamp operating mechanism pushes the entire assembly by pneumatic cylinder 47 into a position below the handle 51 of the toggle clamp. Pneumatic cylinder 37 by extension of its piston rod 38 drives actuating arm 42, to bring striking member 44 in an arc-upwardly to strike against the handle 51 of toggle clamp and thus raise toggle arm 54 to release the clamp from the core 11 of the assembly. This energizes limit switch (not shown) in the clamping mechanism and de-energizes unclamp solenoid, causing rod 38 to retract and thus closes the circuit to energize the solenoid of cylinder 31. The lifting members driven by cylinder 31 to engage with yoke 12 of core 11 and begin to raise the core from the tub 86. The lifting members 20 raise the core to a level slightly above the level of the barbed portion of the hook 8 arriving on the overhead trolley conveyor. As the shank portion of the hook makes contact with the hook detector 83, the hook detector de-energizes the solenoid of hydraulic cylinder 31 and thus the lifting members 20 are lowered so that cross piece 9 of handle 10 of core 11 is placed onto the hook. The lifting members 20 are lowered so that bolt 23 contacts limit switch 33 which actuates the solenoid of pneumatic cylinder 73 to raise arm 81 of the towbar assembly out of engagement with conveyor pin 17 so that the truck conveyor can go on to the tank removal operation. This de-energizes the solenoid of pneumatic cylinder 73 and thus lowers arm 81 of the towbar assembly into engagement position for the next truck conveyor and pneumatic cylinder 83 through its piston rod 84 pushes the entire assembly back into a waiting position for the arrival of the next truck conveyor.

While for the sake of clarity, various parts of the mechanism have been described as driven by hydraulic or pneumatic cylinders, it is within the scope of the invention to utilize other types of fluid driven motors or other driving mechanisms to actuate the moving parts. Thus for example the function of cylinder 83 could be fulfilled by the use of a spring attached between the primary and secondary frames. Other suitable and equivalent mechanisms may be readily substituted by one skilled in the art. The electrical interconnection of the various limit switches and solenoids have not been illustrated, since it is felt that these may be readily supplied by an artisan skilled in the art and further do not, per se, form a part of this invention.

Accordingly, it will be apparent that many modifications and variations may be made in the form of this invention without departing from the spirit and scope thereof and no limitations should be imposed except as to be commensurate with the appended claims.

I claim:

1. A transfer device, adapted for use with an overhead trolley conveyor which utilizes a hook for conveying objects and a lower conveyor for conveying objects, said transfer device being adapted for transferring an object from one conveyor to another and which comprises: a movable frame straddling said trolley and lower conveyors, said frame comprising: a center cross piece located above said conveyors and two pendant side members located on either side of said conveyors, said pendant side members containing a track and a transfer means operative therein, said transfer means consisting of a double acting fluid motor, a piston rod, a source of fluid power, a reversible solenoid actuated valve adapted to reverse the flow of fluid to said fluid motor, a pair of chain members, two pairs of sprocket members, each pair of sprocket members being connected to said chain member, a rotatable shaft connecting one of each pair of sprocket members to another sprocket member of the other pair, a set of lifting members connected to said chain members and disposed in said tracks, one of said lifting members being operatively connected to said piston rod to be driven by it vertically along said track, and a first sensing means located at the uppermost point of said track, said sensing means being energized by contact with said lifting member; one of said pendant side members containing an engagement means for engaging with an article on said lower conveyor, said engagement means containing a second sensing means which is energized by contact with said article and said frame containing a third sensing means at the level of said trolley conveyor for sensing the arrival of a hook, said solenoid actuated valve being responsive to said second sensing means to supply fluid to said fluid motor to cause it to raise said lifting members, and said solenoid valve being responsive to said first sensing means to stop the flow of fluid to said fluid motor, and said solenoid actuated valve being responsive to said first and third sensing means to reverse the flow of fluid to said fluid motor to lower said lifting members; in combination with a yieldable holding means for holding said movable frame in engagement with said article on said lower conveyor.

2. A transfer device, adapted for use with an overhead trolley conveyor which utilizes a hook for conveying objects and a lower conveyor for conveying objects, said transfer device being adapted for transferring an object from one conveyor to the other and which comprises: a movable frame straddling said trolley and lower conveyors, said frame comprising: a center cross piece located above said conveyors and two pendant side members located on either side of said conveyor, said pendant side members containing a transfer means adapted for vertical movement to and from the level of said trolley and lower conveyors, an engagement means operatively connected on one of said pendant side members at the level of the lower conveyor, said engagement means being adapted to engage with an object on the lower conveyor and a sensing means connected to said frame at the level of the trolley conveyor and adapted to sense the arrival of a hook on said trolley conveyor, said transfer means being responsive to said sensing means to transfer an object vertically from one conveyor to the other, in combination with holding means for holding said movable frame in engagement with said object on said lower conveyor.

3. A transfer device, adapted for use with an overhead trolley conveyor which utilizes a hook for conveying objects and a lower conveyor for conveying objects, said transfer device being adapted for transferring an object from one conveyor to the other and which comprises: a movable frame straddling said conveyor, said frame comprising: a center crosspiece located above said conveyor and two pendant side members, located on either side of said conveyor, said pendant side members containing transfer means adapted for vertical movement in said pendant side members and containing lifting members adapted for slidably positioning and vertically transferring an object from one conveyor to a desired position on the other, and engagement means operatively connected on one of said pendant side members at the level of the lower conveyor, said engagement means being adapted to engage with an object on the lower conveyor and a sensing means connected to said frame at the level of the trolley conveyor and adapted to sense the arrival of a hook on said trolley conveyor, said transfer means being responsive to said sensing means so as to transfer an object vertically from one conveyor to the other, in combination with holding means for holding said movable frame in engagement with said object on said lower conveyor.

4. The device as defined in claim 3 in which the transfer means is a pair of angle iron lifters with the vortex of each angle iron pointing downwardly and the hypotenuse formed by the legs of each angle iron being at least two inches.

5. A transfer device as defined in claim 3 which is further combined with a deflecting means loacted on said pendant side member at the level of the hook of said trolley conveyor, and which is adapted to deflect said hook and hold it clear while said transfer means is lowering an object to said lower conveyor.

6. A transfer device for removing an object from a hook suspended from a trolley conveyor, which comprises a frame, said frame consisting of a crosspiece and two pendant side members, located astraddle said trolley conveyor, said frame containing a first sensing means located at the level of said hook for signalling the arrival of said hook, transfer means located in said pendant side members and adapted for vertical movement therein, said transfer means being responsive to said sensing means for lifting said object clear from said hook and for lowering said object and deflecting means for deflecting said hook while said object is being lowered.

7. A transfer device as defined in claim 6 in which said deflecting means comprises a support attached to said frame at the level of said hook, a fluid driven cylinder, a piston rod and a striker arm pivotably attached to said support and driven by said piston rod, a second sensing means activated by extension of said piston rod, said cylinder being responsive to the level of said transfer means at its upper position so as to drive said striker arm against said hook to deflect same and to activate said second sensing means so as to cooperate with said first sensing means to reverse the direction of said transfer means whereby the hook is deflected while the transfer means is lowered.

8. A transfer device for transferring an object from a lower truck conveyor to a hook suspended on an overhead trolley conveyor which comprises a stationary supporting frame and a secondary frame movable thereon, said frames being disposed in straddle relation to said truck and trolley conveyors, said supporting frame containing a low pressure fluid cylinder and piston rod adapted to yieldably hold said secondary frame against unrestrained movement on said supporting frame, said secondary frame comprising: a crosspiece and two pendant side members, an engagement means at the level of said truck conveyor adapted to engage with a truck on said truck conveyor and to move said secondary frame therewith until said truck comes to rest against the resistance of said low pressure fluid cylinder and piston rod, said engagement means containing a first sensing means which is energized upon contact with said truck; transfer means located in said pendant side members and adapted for vertical movement therein, said transfer means being responsive to said first sensing means to lift an object from said truck conveyor to a level above the barbed portion of said hook; a second sensing means located on said secondary frame at the level of said trolley conveyor for sensing the arrival of said hook, and means responsive to said second sensing means for lowering said transfer means to deposit said object on said hook.

9. A transfer device for use in placing an object on a hook suspended from a trolley conveyor, which comprises a frame comprising a crosspiece and two pendant side members in straddle relationship to said conveyor, said pendant side members containing transfer means adapted for vertical movement therein and adapted to lift said object to a level above the barbed portion of said hook, said frame containing sensing means located at the level of said hook for signalling arrival of said hook said transfer means being responsive to said sensing means for lowering and depositing said object on said hook.

References Cited in the file of this patent

UNITED STATES PATENTS

| | | |
|---|---|---|
| 1,514,333 | Ooms | Nov. 4, 1924 |
| 1,578,726 | Hamilton et al. | Mar. 30, 1926 |
| 2,431,618 | Rayburn et al. | Nov. 25, 1947 |
| 2,813,643 | Prentice | Nov. 19, 1957 |